(12) United States Patent
Friedman

(10) Patent No.: US 7,404,705 B2
(45) Date of Patent: Jul. 29, 2008

(54) BLENDING PUMP ASSEMBLY

(75) Inventor: Mitchell A. Friedman, Randallstown, MD (US)

(73) Assignee: International Dispensing Corporation, Millersville, MD (US)

( * ) Notice: Subject to any disclaimer, the term of this patent is extended or adjusted under 35 U.S.C. 154(b) by 0 days.

(21) Appl. No.: 11/593,826

(22) Filed: Nov. 7, 2006

(65) Prior Publication Data

US 2007/0071625 A1    Mar. 29, 2007

Related U.S. Application Data

(63) Continuation of application No. 10/719,605, filed on Nov. 21, 2003, now Pat. No. 7,131,826.

(60) Provisional application No. 60/428,115, filed on Nov. 21, 2002.

(51) Int. Cl.
*F03C 2/00* (2006.01)
*F04C 2/00* (2006.01)

(52) U.S. Cl. .................. 418/9; 418/5; 418/13; 418/58; 418/61.1; 418/206.1

(58) Field of Classification Search ................ 418/209, 418/58, 61.1, 5, 7, 9, 10, 13, 206.1
See application file for complete search history.

(56) References Cited

U.S. PATENT DOCUMENTS

| 1,103,053 | A |   | 7/1914  | Kiefer    |       |
|-----------|---|---|---------|-----------|-------|
| RE16,406  | E |   | 8/1926  | Barton    |       |
| 1,734,779 | A | * | 11/1929 | Randolph  | 418/9 |
| 2,567,997 | A |   | 9/1951  | Granberg  |       |
| 2,611,323 | A |   | 9/1952  | Digney    |       |
| 2,779,291 | A |   | 1/1957  | Albright  |       |
| 2,833,224 | A |   | 5/1958  | Meyer et al. |    |
| 2,966,860 | A |   | 1/1961  | Maynard   |       |
| 3,067,590 | A |   | 12/1962 | Wood, Jr. |       |
| 3,139,834 | A |   | 7/1964  | Blomgren et al. |  |
| 3,179,383 | A |   | 4/1965  | Knedlik   |       |
| 3,213,873 | A |   | 10/1965 | Cordis    |       |
| 3,481,532 | A | * | 12/1969 | Fraser    | 418/9 |
| 3,575,535 | A |   | 4/1971  | Bickar    |       |
| 3,614,275 | A |   | 10/1971 | Eibsen    |       |
| 3,821,963 | A |   | 7/1974  | Olson et al. |    |
| 3,894,722 | A |   | 7/1975  | Jones     |       |
| 3,951,575 | A |   | 4/1976  | Motomura et al. | |
| 4,026,681 | A |   | 5/1977  | Roskelley |       |
| RE29,620  | E |   | 5/1978  | Picker    |       |
| 4,278,132 | A |   | 7/1981  | Hostetter |       |

(Continued)

FOREIGN PATENT DOCUMENTS

JP    3556014889 A    2/1981

*Primary Examiner*—Theresa Trieu
(74) *Attorney, Agent, or Firm*—Whiteford, Taylor & Preston LLP; Jeffrey C. Maynard; Gregory M. Stone

(57) ABSTRACT

A blending pump assembly for accurately maintaining the proper ratio of two fluid components. Flow of a first fluid is utilized to drive a fluid motor, which in turn drives a pumping mechanism to inject a proportional amount of a second fluid into the flow of the first fluid. The fluid motor and pump are sized so that a predetermined ratio between the two fluids is maintained regardless of changes in pressure and flow rate of such first fluid.

14 Claims, 12 Drawing Sheets

U.S. PATENT DOCUMENTS

| | | |
|---|---|---|
| 4,511,378 A | 4/1985 | Greene |
| 4,747,762 A | 5/1988 | Fairbairn |
| 5,012,837 A | 5/1991 | Zepp |
| 5,150,742 A | 9/1992 | Motohashi et al. |
| 5,156,301 A | 10/1992 | Hassell et al. |
| 5,297,945 A | 3/1994 | Loubier et al. |
| 5,466,131 A | 11/1995 | Altham et al. |
| 5,492,556 A | 2/1996 | Garrett |
| 5,588,088 A | 12/1996 | Flaman |
| 5,725,362 A | 3/1998 | Zepp et al. |
| RE35,780 E | 5/1998 | Hassell et al. |
| 6,029,688 A | 2/2000 | Kaufman |
| 6,036,453 A | 3/2000 | Zepp et al. |
| 6,325,604 B1 | 12/2001 | Du |
| 6,357,466 B1 | 3/2002 | Walton et al. |
| 6,431,198 B2 | 8/2002 | Walton et al. |
| 7,131,826 B1 * | 11/2006 | Friedman .................. 418/9 |
| 2001/0031215 A1 | 10/2001 | Klassen |
| 2002/0017320 A1 | 2/2002 | Walton et al. |

\* cited by examiner

BLENDING PUMP ASSEMBLY

CROSS-REFERENCE TO RELATED APPLICATIONS

This application is a continuation of U.S. patent application Ser. No. 10/719,605 entitled "Blending Pump Assembly," now U.S. Pat. No. 7,131,826, filed with the U.S. Patent and Trademark Office on Nov. 21, 2003 by the inventor herein, which application is based upon and claims benefit of now abandoned and co-owned U.S. Provisional Patent Application Ser. No. 60/428,115 entitled "Blending Pump Assembly", filed with the U.S. Patent and Trademark Office on Nov. 21, 2002, by the inventor herein, the specifications of which are incorporated herein by reference.

BACKGROUND OF THE INVENTION

1. Field of the Invention

The invention disclosed herein relates generally to a proportioning pump assembly, and more particularly to a pumping apparatus that maintains the ratio of two pumped fluids, which ratio is unaffected by alterations in the pressure and velocity of the flowing fluids.

2. Background of the Prior Art

Several devices have been developed for injecting predetermined quantities of liquid additives into a liquid flow stream. For example, beverage dispensing valves that provide for the mixing of carbonated water and syrup to produce a dispensed beverage are well known in the art. Other applications such as adding medication to drinking water with such additives as chlorine or iodine and adding fertilizer concentrate to irrigation water are similarly well known.

A number of fluid pumps have been designed which inject an additive into the primary fluid stream where the primary fluid provides the motive fluid for activating the additive injection pump. For example, Reissue Pat. No. 35,780 to Hassell et al. discloses a beverage dispensing valve having two sets of oval gears in which the ratio of two liquid beverage constituents is maintained by the interaction of the oval gear pairs, which are sized so that the desired ratio is maintained. Flow is regulated through use of solenoid operated pallet valves for each liquid component.

U.S. Pat. No. 3,821,963 to Olsen et al. discloses a liquid proportioning apparatus for injecting a liquid into the flow of a driving liquid. The apparatus uses an eccentric paddle wheel as the fluid motor to drive a separate pump for a second liquid to be injected into the driving flow.

U.S. Pat. No. 6,357,466 to Walton et al. discloses an apparatus for generating a mixture of a first fluid and a measured quantity of a second fluid in a fluid stream. The gears of a flow meter rotate when a first fluid is passed through the flow meter. A shaft connected coaxially with a gear of the flow meter is connected with a gear of a cavity pump for a second fluid so that the second fluid is pumped through the cavity pump when the first fluid is directed through the flow meter.

While the above-mentioned compound motor/pump assemblies have been generally satisfactory to enable a driving fluid to be used as the motive force to drive a fluid motor which in turn drives a proportional pump, these devices have not enjoyed significant commercial success. While positive displacement pumps, such as gear pumps, may at times have the capacity to be used as a fluid motor, their design typically enables leakage past the gears between the gear teeth and the housing, and between the gear sidewalls and the housing. For mixing applications requiring precise mixing ratios, this leakage (and the variable mixing ratios that result) can render such assemblies useless. Unfortunately, manufacturing the gear pump components with ultra-tight tolerances to minimize such clearance often increases the cost of such assemblies to render them uneconomical. Moreover, very small clearances may result in high friction and difficulty in getting the motor started at low fluid pressures. Still further, prior art fluid motor and pump assemblies have typically been provided in configurations that limit their adaptability to varied mixing ratios due to a fixed relationship between the rate of rotation of a driving gear in the fluid motor and a driven gear in the fluid pump, and thus fail to provide a practical pump assembly enabling customized mixing proportions to be obtained. It would be advantageous to provide a means to adjust the flow proportion in a fast, easy manner. Accordingly, there remains a need for an apparatus that enables consistent, direct proportioning of flow of two liquids independent of the pressure and velocity of the driving liquid while enabling both fine and gross adjustment of the flow ratio in a simple manner, but of a sufficiently simplistic construction so as to maintain ease of manufacturing and low cost.

SUMMARY OF THE INVENTION

The blending pump assembly of the instant invention comprises a fluid motor, the motor having an inlet fluidly connected to a source of a first fluid and an outlet, a pump having an inlet fluidly connected to a source of a second fluid and an outlet, such fluid motor being operatively engaged with such pump through a drive which transfers torque from the fluid motor to the fluid pump, the fluid motor and pump being interconnected in such a way that a predetermined ratio between such first fluid and such second fluid is consistently maintained, irrespective of the pressure and velocity of the driving liquid. In a first exemplary embodiment, the blending pump assembly may be provided an internal recirculation channel controlled by a valve to enable adjustment of the fluid proportions. In a second exemplary embodiment, the blending pump assembly may be provided with modular quick-connect fluid pump blocks which provide varying flow rates for a given angular velocity of the driving gear of the fluid motor. Likewise, the blending pump assembly may simultaneously provide both a recirculation channel and a modular quick-connect fluid pump block to enable both fine and gross adjustment of the ratio between dispensed diluent and concentrate.

The blending pump assembly described thus provides proportioning of two fluids in a tightly controlled manner, and may provide adjustment of such proportion for fine and gross control of the ratio of such two fluids.

The compound motor/pump structure allows torque produced from the shaft in a fluid motor assembly to be used to drive a pump assembly connected thereto in such a way that the output from the pump maintains a desired proportion to the output of the fluid motor, irrespective of the flows there through. The first fluid motor assembly is preferably driven by fluid pressure from a first fluid directed through an inlet port, which flow in turn drives the shaft in the fluid motor assembly. The torque generated is translated from the shaft to a gear in the connected pump. A fluid motor body includes an inlet for a first fluid and a corresponding outlet, while the pump body includes an inlet for a second fluid and a corresponding outlet. The first fluid inlet and outlet on the fluid motor body are in fluid communication with a chamber within the main motor body. Likewise, the second fluid inlet and outlet on the pump body are in fluid flow communication with a chamber within the pump body. In one embodiment, the first fluid inlet and outlet on the fluid motor body are in fluid communication with one pair of circular gears positioned within the chamber in the motor, and the second fluid inlet and outlet on the pump body are in fluid communication with a second pair of circular gears positioned within the chamber in the pump. The first pair of circular gears comprises a gear motor, while the second pair of circular gears comprises a gear pump. Alternately, the gear pairs may be replaced with a single gear element in either or both of the pump and motor assemblies, such as an eccentrically mounted impeller. Each gear or gear pair, as the case may be, preferably rotates in its own housing, fluidly separate from the other gear pair.

In one aspect of a preferred embodiment of the invention, a recirculation channel is provided in the gear pump assembly that enables fine adjustment of the compound motor/pump output. More particularly, a "tee" connector may be positioned in the flow line of the pump, downstream of the pump outlet, which allows fluid communication between the pump flow line downstream of the pump and the pump flow line upstream of the pump. A needle valve or similarly constructed flow control device may be positioned in the flow branch interconnecting the downstream line with the upstream line. In this way, minute adjustment of such flow control device may bleed off a portion of the fluid output from the pump assembly, directing such fluid back to the pump input, and in turn enable fine adjustment of the amount of fluid dispensed from the pump flow line for a given amount of first fluid passing through the fluid motor.

In an aspect of another embodiment of the invention, gross adjustment of the proportional flow of a first fluid to a second fluid may be provided in a simple adjustment step. More particularly, the pump housing may be pivotally attached to the motor housing, and an intermediate drive mechanism, such as a gear train, may be provided between the two such that torque from the fluid motor drive shaft is transferred to the drive shaft of the driven member of the pump through such gear train. The gears between the two housings may be selected to provide the desired proportional speeds of the motor and pump. Moreover, because the pump housing is pivotally mounted to the motor housing, the pump housing may be pivoted to allow access to and replacement of the gears of the gear train, and thereafter pivoted and locked back into a position in which the gears of the gear train engage one another, thus enabling gross changes in proportioned flow rates to be achieved in a quick and easy manner. Alternately, the gear train may remain fixed, and the driven gear or gears within the pump may vary from pump block to pump block, such that switching out one pump block for another may provide changes in proportioned flow rates.

In operation of a first embodiment, a pressurized first fluid is provided to the fluid motor fluid channel inlet and is delivered to the operative gear member(s) therein for providing rotation thereof. The first fluid then flows out of the fluid channel outlet. It can be understood that, as one of the gear members of both the fluid motor and the fluid pump is on a common rotating shaft (or operatively engaged with one another through a connecting mechanical drive such as a gear train), the pressurized first fluid provides for the driving force for the gear pump for the second fluid. The gear members are dimensioned such that, for each revolution of the gear members, a predetermined ratio of such first and second fluid is delivered. Moreover, such ratio is maintained regardless of the rotation rate of the gear members. The gear pump output may be finely adjusted by permitting a portion of the output to recirculate back to the pump inlet thereby reducing the quantity of such second fluid injected into the first driving fluid stream, and may be grossly adjusted by replacing drive gears between the fluid motor and fluid pump. In addition, as the member(s) of the fluid pump serve as a pump, it is not necessary to pressurize the second fluid source for the delivery thereof to the blending pump assembly.

In another aspect of a preferred embodiment of the invention, the gear members within the fluid motor housing (and optionally the fluid pump housing) may be configured to minimize clearance between the gear teeth and the sidewalls of the chamber, and between the top and bottom surfaces of the gear member(s) and the top and bottom walls of the chamber. More particularly, in a preferred embodiment of the invention, one or more parallel tooth gears are provided in a tapered configuration (i.e., having a cone-shaped perimeter), and the motor housing is similarly tapered so that the gear(s) can be individually placed in the tapered housing to a depth that would ensure a close fit regardless of manufacturing tolerances. The clearance at one or both faces of the gear member(s) may then be filled by one or more upper and lower flat shims, thus resulting in close clearances between both the outside diameter of the gear member(s) and the housing, and between the gear face(s) and the housing.

Notably, with respect to each of the above-described embodiments, the connection between the fluid motor and pump is one of a direct drive engagement, such that a desired proportional flow may be maintained at all times, irrespective of the pressure or velocity at which the driving fluid flows through the fluid motor. Moreover, the mechanisms provided herein for both fine and gross adjustment require few parts, such that the compound motor/pump assembly of the instant invention requires less maintenance, and may likewise be provided at lower cost, than prior known blending apparatuses. Still further, the features of fine and gross adjustment of proportional flow rates set forth herein enables much finer proportioning control than previously known blending apparatuses, and thus may be used in applications requiring very large proportioning ratios. Even further, the tapered gear construction feature enables operation of the fluid motor (and optionally the fluid pump) at greater efficiency and with less leakage than prior known systems without requiring expensive manufacturing processes to reduce clearances between motor members.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and exemplary embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
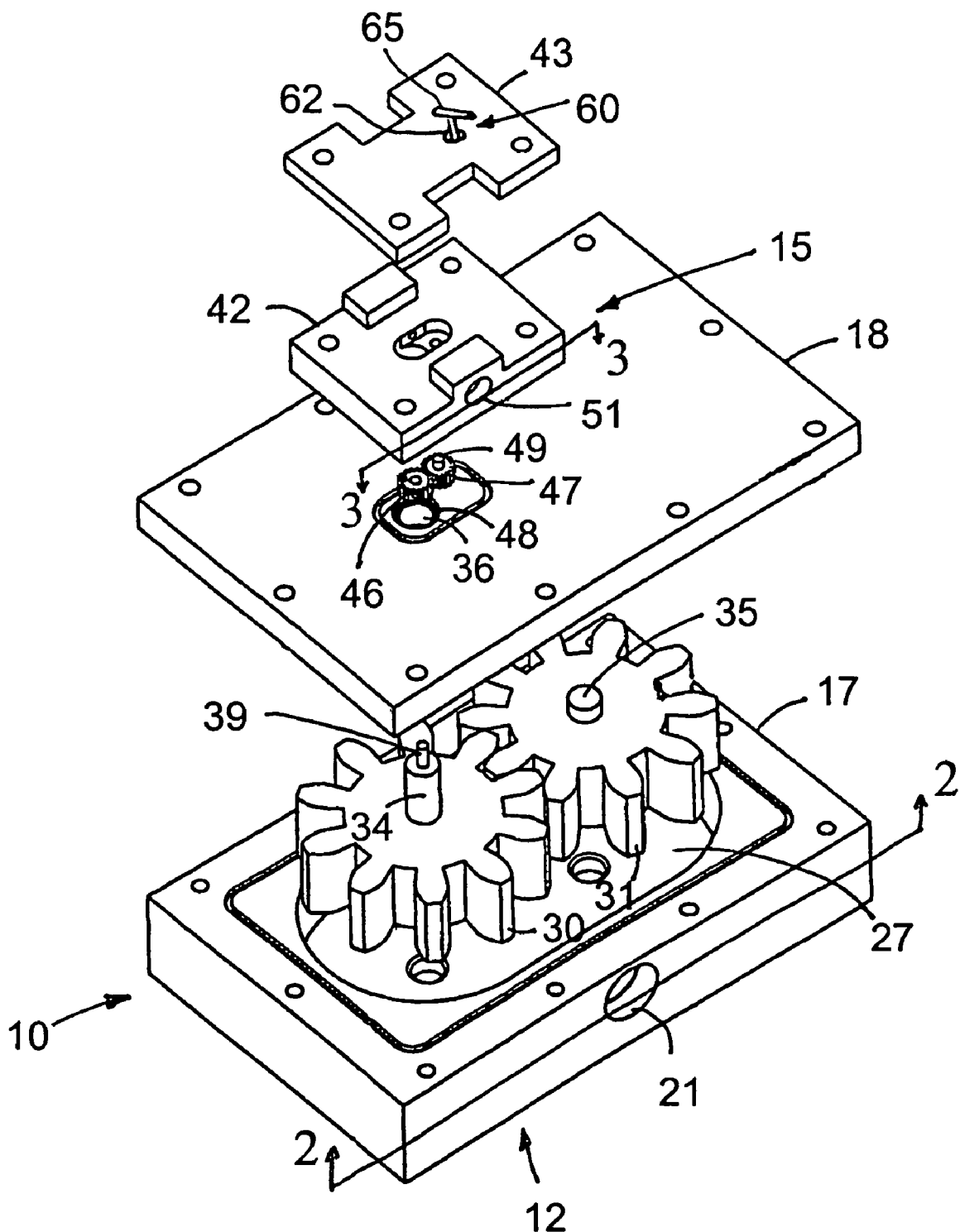
FIG. 1 is an exploded perspective view of a blending pump assembly according to one embodiment of the instant invention.
Figure 7:
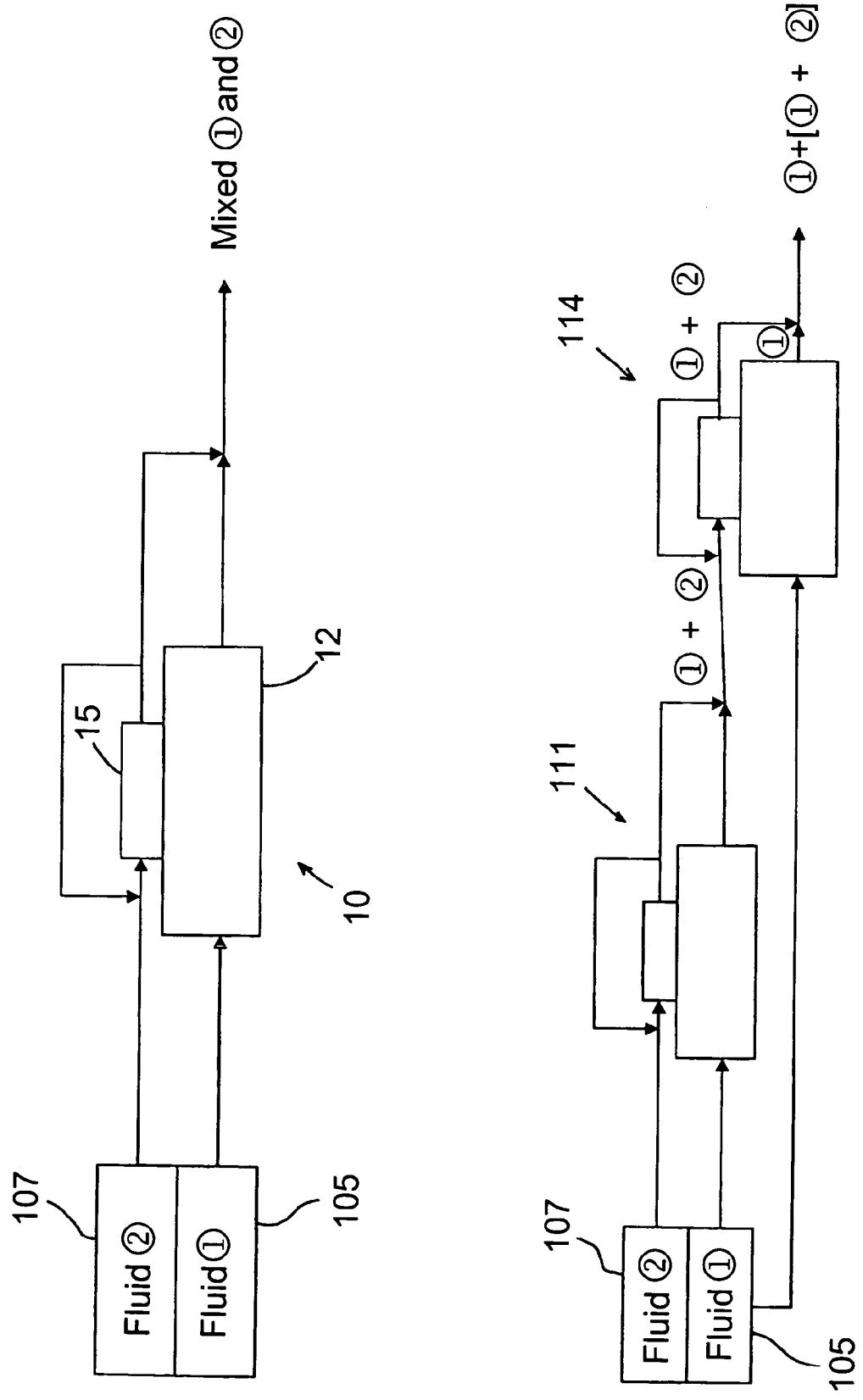
FIG. 7 is a schematic drawing of a first and second embodiment of the present invention.

A first preferred embodiment of the compound motor/pump assembly of the instant invention is shown in FIG. 1. A blending pump assembly, generally designated as 10, includes a lower gear motor assembly 12 and an upper gear pump assembly 15. Lower gear motor assembly 12 comprises gear motor body 17 and cover 18, the motor body 17 having an inlet fluid channel 21 and an outlet fluid channel 24 (best seen in FIG. 2). Inlet fluid channel 21 may be in fluid communication with a pressurized source of a first fluid as shown in FIG. 7. Motor body 17 further includes a cavity 27 wherein a first pair of gears 30, 31 is nested. Gears 30, 31 may be circular gears having a plurality of teeth about their periphery, such that the teeth of gear 30 intermesh with the teeth of gear 31. In the particular embodiment depicted in FIG. 1, shaft 34 is rotatively secured to motor body 17 and fixedly secured to gear 30, and extends from gear 30 upward through aperture 36 in cover 18 to provide a drive axle 39 for upper gear pump assembly 15. Gear 31 freely rotates on shaft 35, rotatively secured between motor body 17 and cover 18.

Notably, alternate fluid motor constructions may likewise be used without departing from the spirit and scope of the invention. For example, instead of gears 30, 31, a vane pump, a flexible rotor pump, or similarly configured pump assemblies capable of being driven by a motive fluid and transferring torque to a drive shaft 39 may be used for motor assembly 12.

Figure 3:
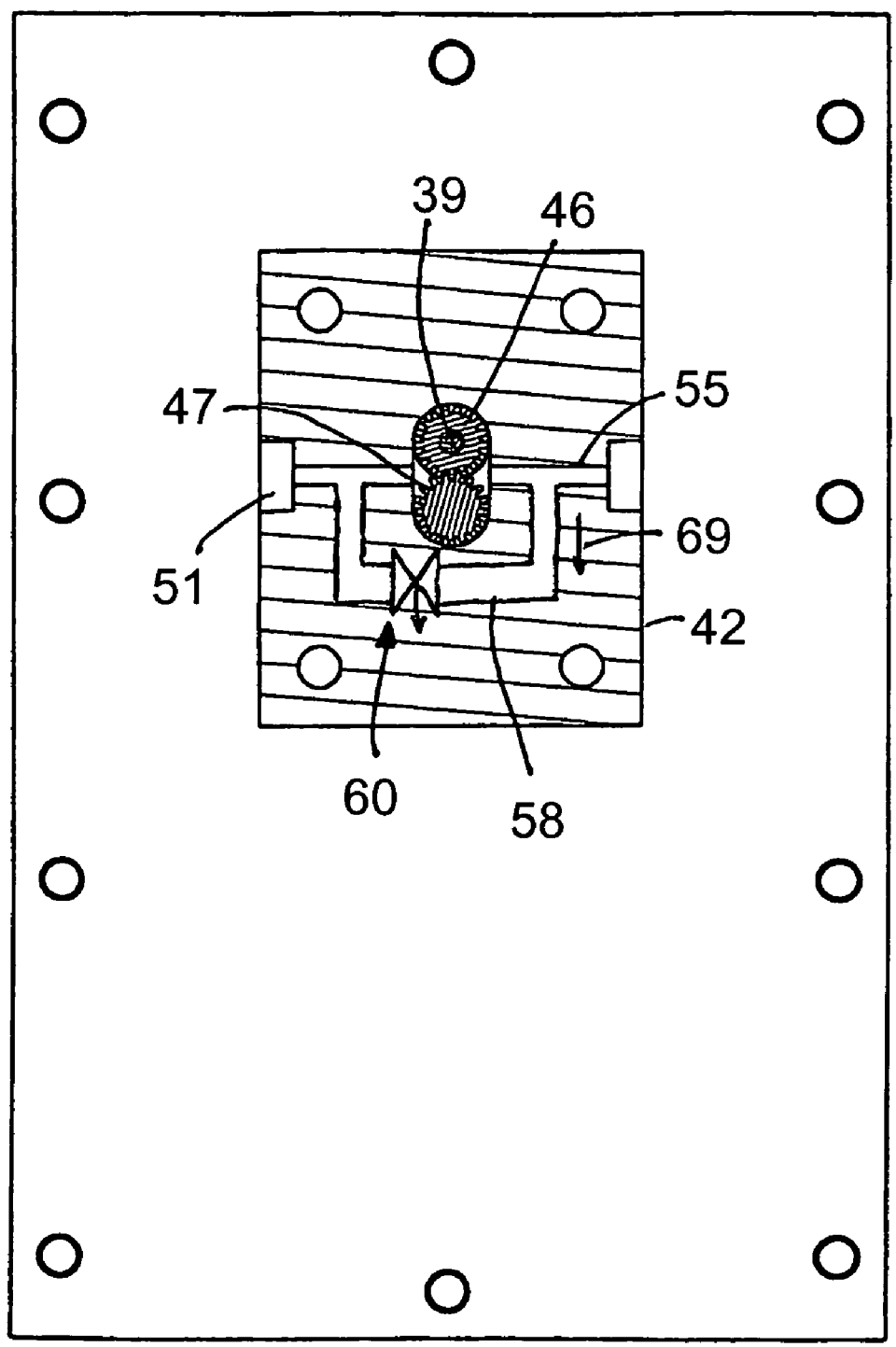
FIG. 3 is a cross section view of the pump portion of the blending pump assembly of FIG. 1.

Referring to FIG. 3, gear pump assembly 15 comprises a gear pump body 42, to which a cover 43 is attached (FIG. 1). A second pair of gears 46, 47 is nested in pump body 42. Gears 46, 47 may be circular gears having a plurality of teeth about their periphery, such that the teeth of gear 46 intermesh with the teeth of gear 47. Gear 46 is securely attached to drive axle 39 such that rotation of gear 30 causes simultaneous rotation of gear 46. A seal 48 in aperture 36 may be provided for preventing fluid communication along shaft 34 between cavity 27 and gear pump body 42. Gear 47 freely rotates on shaft 49, rotatively secured between pump body 42 and cover 43. Pump body 42 has an inlet port 51 and an outlet port 52 creating a flow channel 55 through gear pump assembly 15. Inlet port 51 is in fluid communication with a source of a second fluid as shown in FIG. 7. Such second fluid source need not be pressurized.

In one embodiment of the invention, a recirculation channel 58 is provided in pump body 42 having an adjustable valve 60 to adjust flow through recirculation channel 58. Valve 60 may, for example, comprise a valve stem 62 extending through gear pump cover 43 (best seen in FIG. 1) and a valve handle 65 to permit adjustment of flow through valve 60. Valve 60 may be any appropriate type of valve having throttling characteristics and is preferably a needle valve enabling fine control of flow through recirculation channel 58. Flow through recirculation channel 58 is in the direction indicated by arrow 69 in FIG. 3.

Figure 4A:
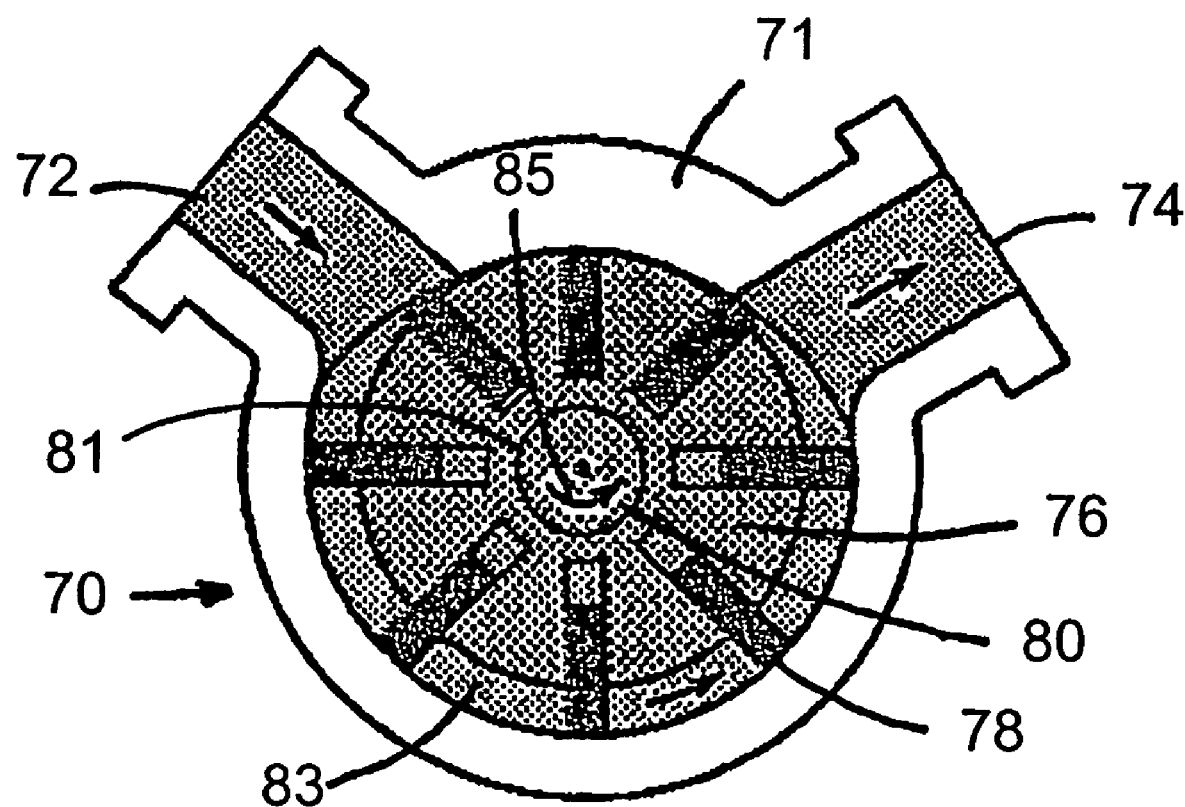
FIG. 4a is a cross section view of a vane pump or motor assembly according to an alternate embodiment of the instant invention.

In an alternate embodiment, the fluid motor, the pump, or both may be other than gear assemblies, in which the fluid motor and pump have a common rotating shaft. For example, a vane pump assembly as illustrated in FIG. 4a can be used as the fluid motor, the pump, or both. Such a vane pump assembly 70 may comprise body 71 having an inlet fluid channel 72 and an outlet fluid channel 74. A slotted impeller 76 having a plurality of vanes 78 is eccentrically supported on shaft 80. Shaft 80 is rotatively secured to body 71. A seal 81 may be provided to prevent fluid leakage along shaft 80. The impeller 76 is located close to body 71 so a crescent-shaped cavity 83 is formed. Vanes 78 fit within slots of the impeller 76 and are configured to extend into such cavity 83 to form a slideable seal against body 71.

When vane pump assembly 70 is utilized as a fluid motor, inlet fluid channel 72 may be placed in fluid communication with a pressurized source of a first fluid (not shown). The pressurized fluid enters the inlet fluid channel 72 and impinges on a first of such plurality of vanes 78 causing impeller 76 to rotate in the direction shown by arrow 85. Such motion of impeller 76 also causes shaft 80 to rotate. Shaft 80 extends outward from body 71 to provide a drive shaft for a connected pump. The pressurized fluid passes through cavity 83 to outlet fluid channel 74.

When vane pump assembly 70 is utilized as a pump, shaft 80 causes impeller 76 to rotate. As the impeller 76 rotates and a second, unpressurized fluid enters the pump, the vanes 78 are pushed to the wall of body 71 forming a tight seal. As impeller 76 rotates, the vanes force such second fluid into the crescent-shaped cavity, and sweep the fluid toward the fluid outlet channel 74.

Figure 2A:
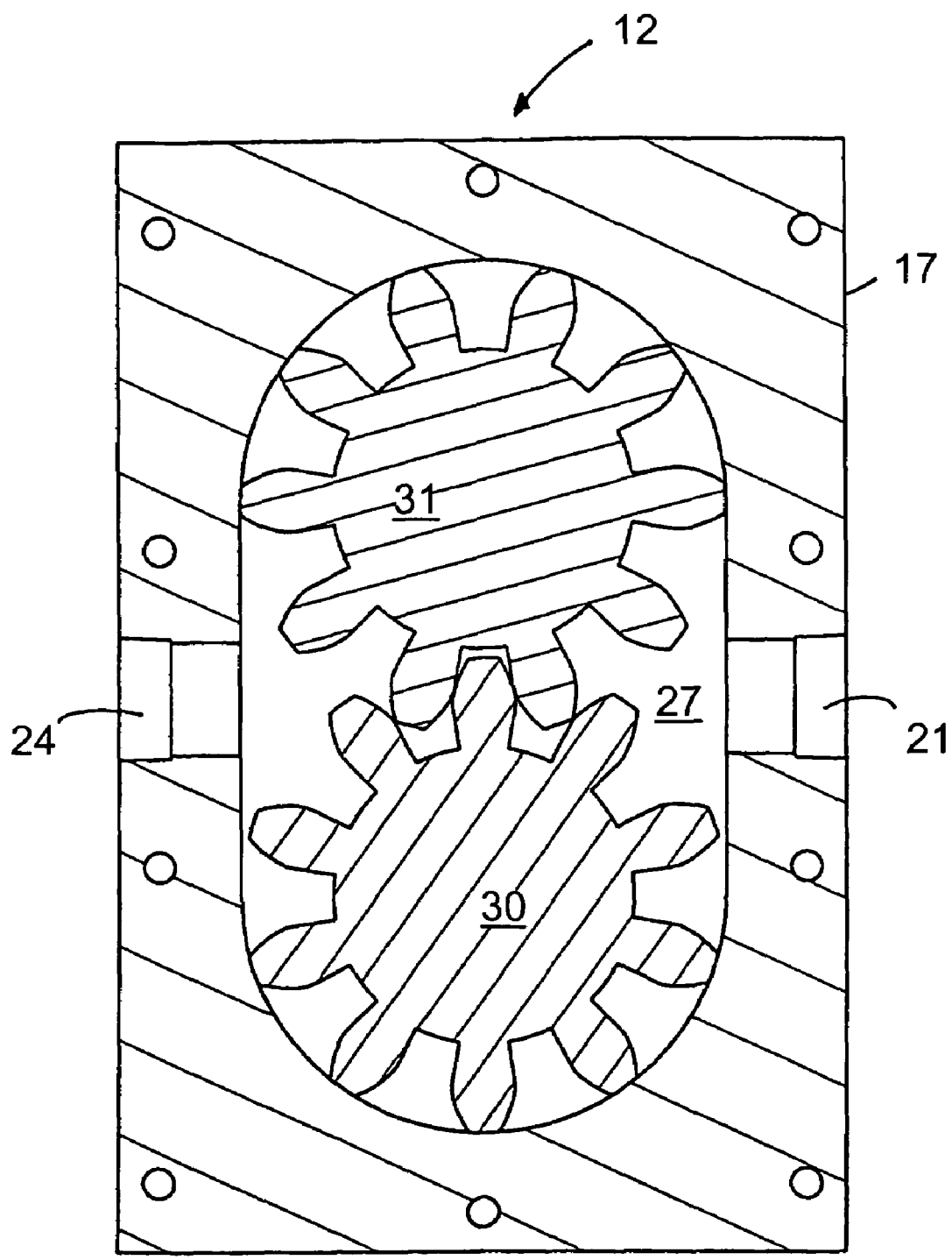
FIGS. 2a and 2b are cross section views of the blending pump assembly of FIG. 1.
Figure 2B:
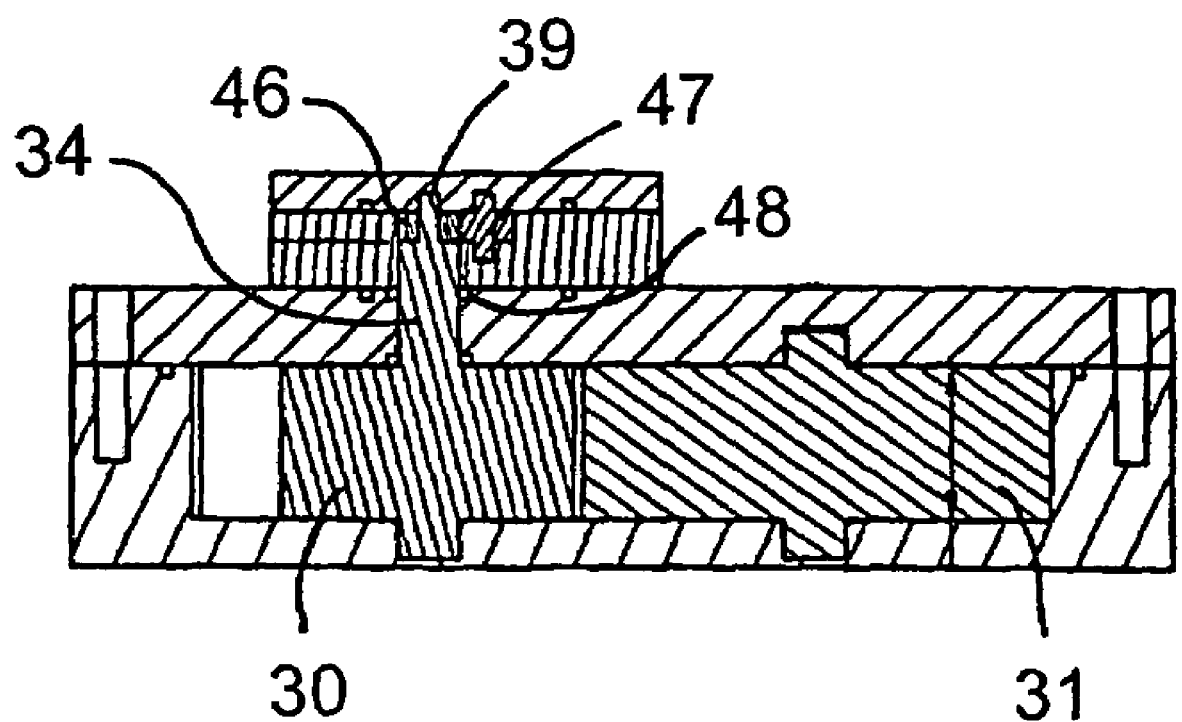
Figure 4B:
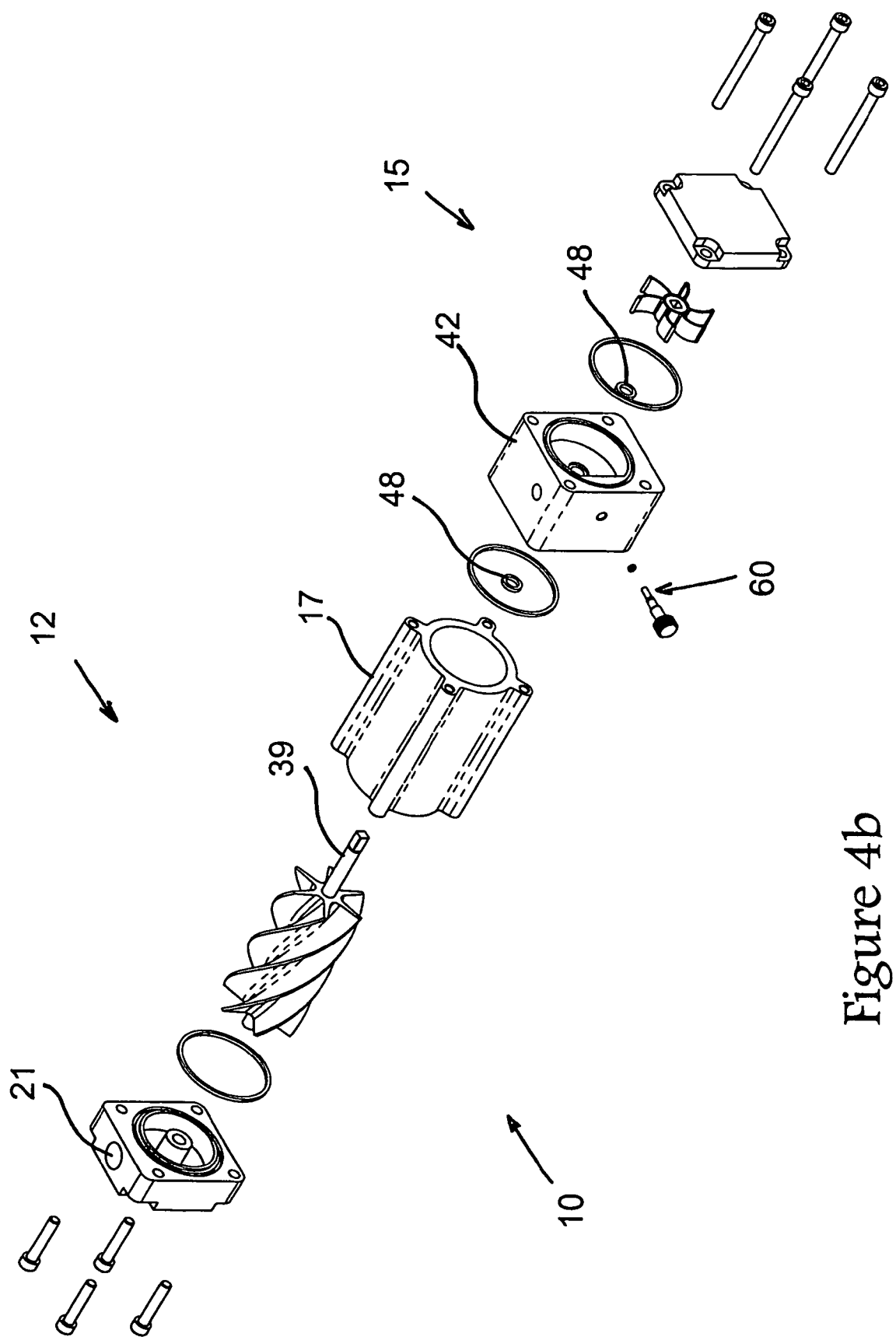
FIGS. 4b and 4c are exploded and sectional views of a screw pump assembly according to another embodiment of the instant invention.
Figure 4C:
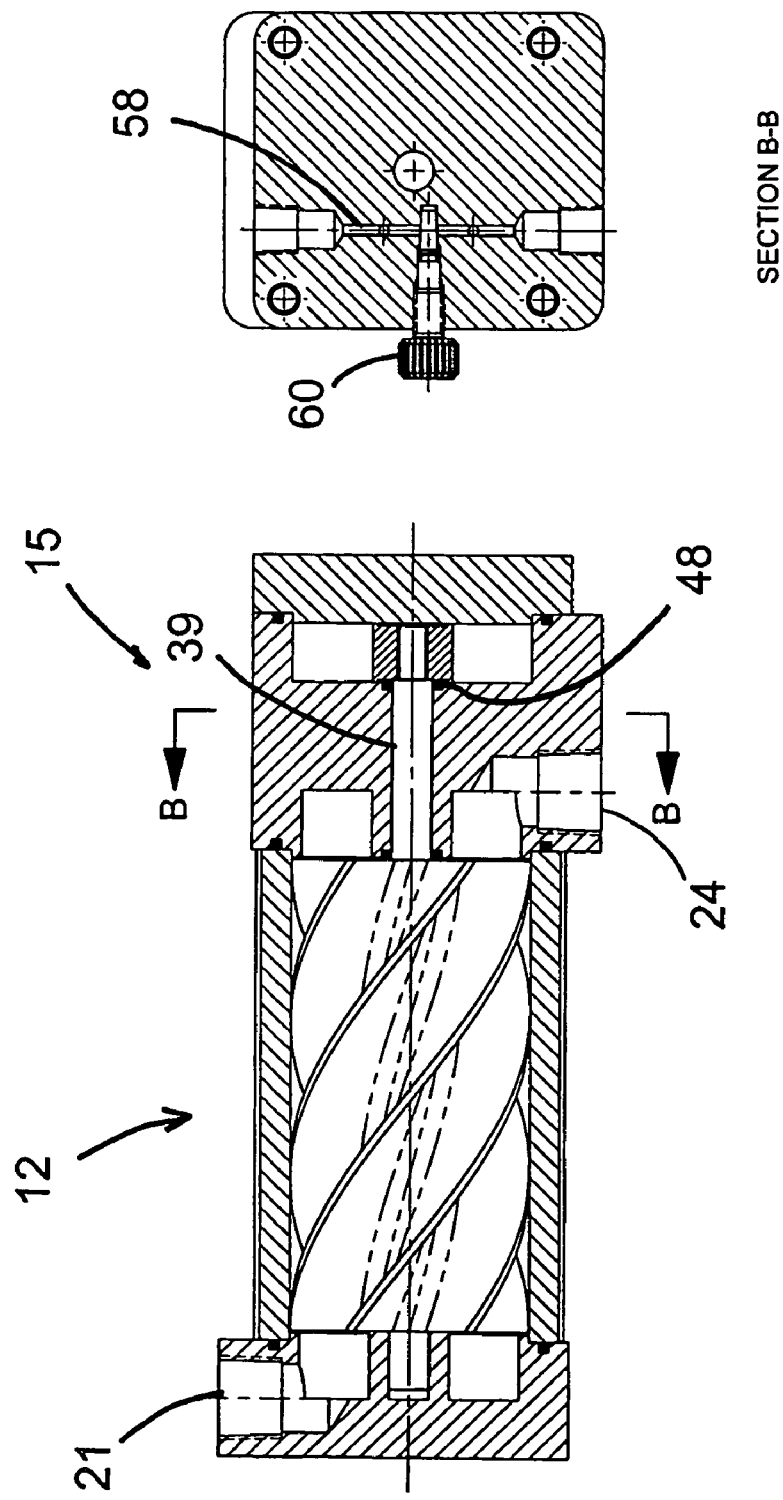

Other combinations of fluid motors and pumps having a common rotating shaft shared between the motor and pump can be used, such as a gear motor, as described with reference to FIGS. 1 and 2, and a vane pump, as described above. In such a case, the shaft of one of the gears in the gear motor drives the impeller of the vane pump. In another embodiment, a vane pump assembly can be used as a fluid motor with its shaft connected to drive one of the gears of a gear pump. Although not specifically described herein, other motor assemblies and/or pump assemblies of generally similar construction may likewise be utilized, such as a flexible vane pump, a screw pump, as shown in FIGS. 4b and 4c, etc.

Figure 5A:
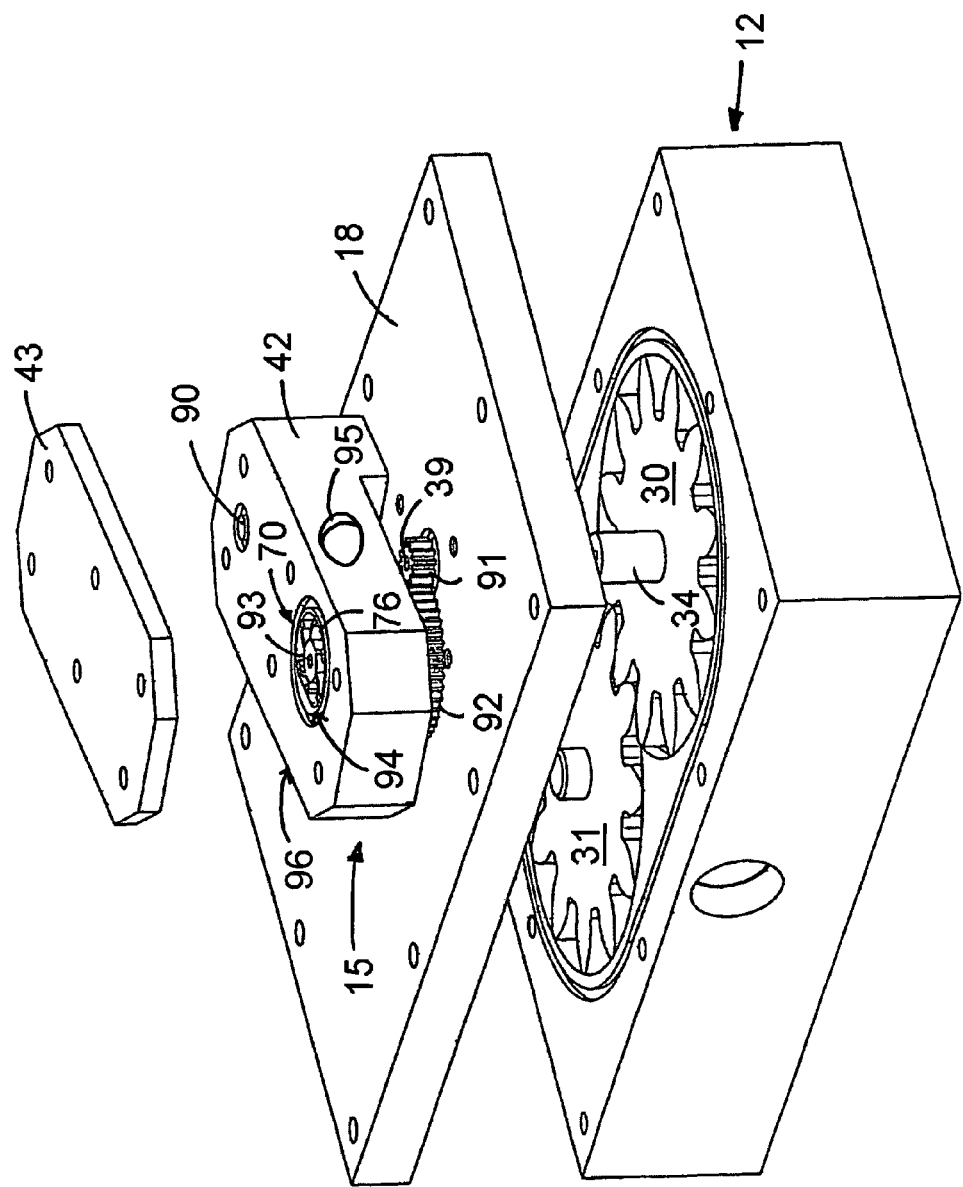
FIGS. 5a-5c are exploded and sectional views of a blending pump assembly according to another embodiment of the instant invention.
Figure 5B:
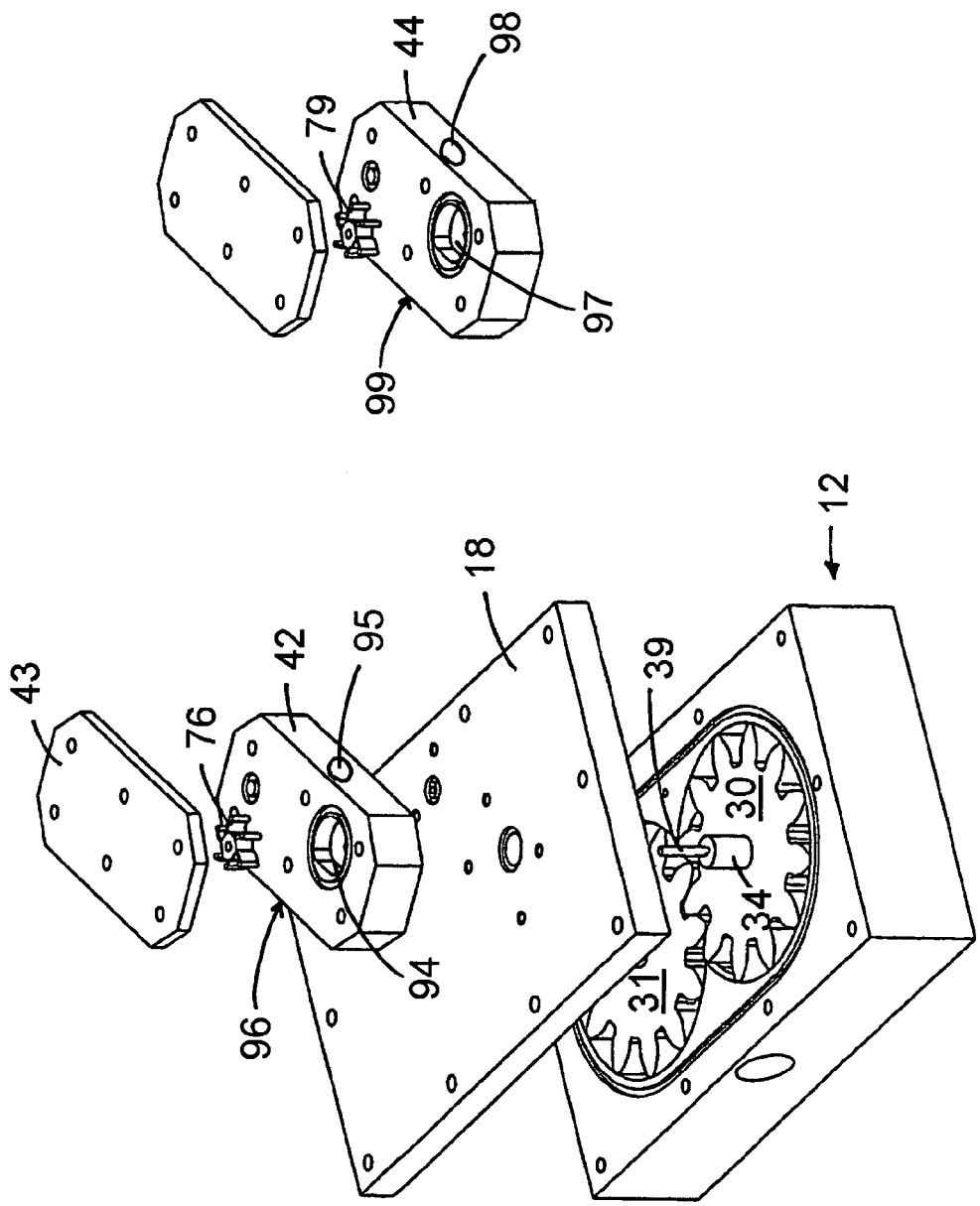
Figure 5C:
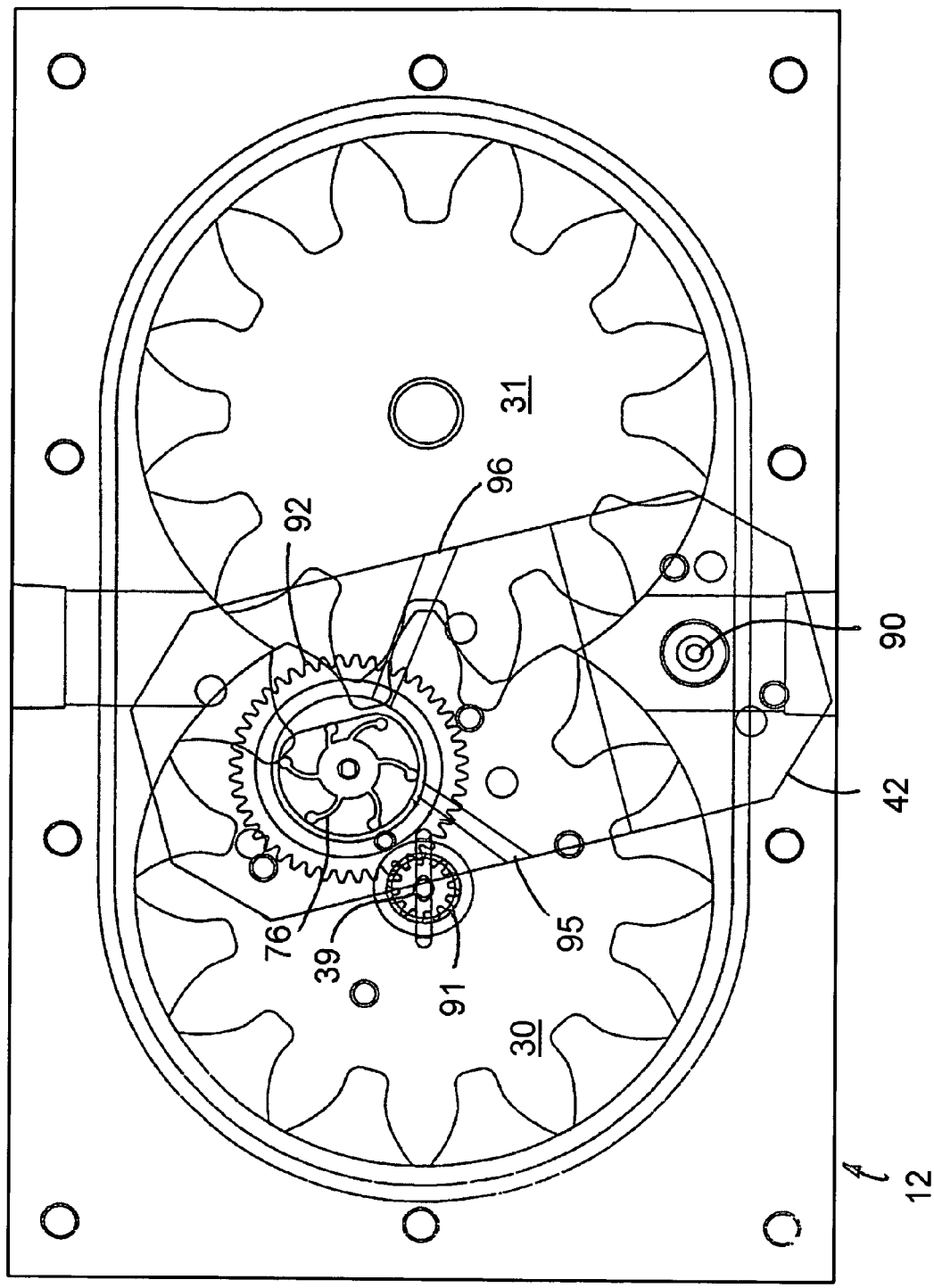

In yet another embodiment, as shown in FIG. 5, gear pump body 42 is pivotally mounted to cover 18 of fluid motor assembly 12 via a pivot screw 90. When tightened, screw 90 locks the position of gear pump body 42, but when loose, screw 90 allows gear pump body 42 to pivot freely about screw 90. Once again, shaft 34 extends upward from first gear 30 in fluid motor assembly 12, and a motor drive axel 39 extends through cover 18. Mounted on the exposed end of motor drive axel 39 is a first drive train gear 91. Once again, application of a pressurized driving fluid through fluid motor assembly 12 will cause rotation of gear 30, in turn causing rotation of drive shaft 39 and first gear 91 mounted thereon. While in the particular embodiment shown in FIG. 5, fluid motor assembly 12 comprises gears 30, 31, as explained above, alternate fluid motor configurations could likewise be utilized without departing from the spirit and scope of the invention, including a vane pump, flexible rotor pump, gear pumps having gears of other geometries, and any other pump assembly which may be driven via application of a pressurized fluid to the flow channel passing there through.

In the particular embodiment depicted in FIG. 5, gear pump body 42 may be constructed to provide an opening between the bottom of gear pump body 42 and cover 18 of fluid motor assembly 12, such opening being of sufficient size to accommodate first gear 91 and a second gear 92. In the embodiment of FIG. 5, gear pump body 42 is depicted as optionally utilizing a flexible vane pump assembly 70 having a flexible rotor 76 mounted within gear pump body 42, with a fluid inlet 95 and fluid outlet 96 directing fluid through gear pump body 42 and the open chamber 94 thereon holding flexible rotor 76. In such case, flexible rotor 76 would preferably be mounted on pump drive axel 93, which in turn is mounted to second gear 92, such that rotation of second gear 92 causes rotation of flexible rotor 76 to in turn pump fluid through the pump assembly. Of course, as explained above, alternate gear elements (such as one or more parallel tooth gears) may be used for the pump assembly without departing from the spirit and scope of the invention.

Because gear pump body 42 is pivotally mounted to cover 18, access may be had to both first gear 91 and second gear 92 by pivoting gear pump body 42. Preferably, first gear 91 is removably attached to drive axel 39, such that first gear 91 may be removed and replaced with a gear having a different gear geometry, thus enabling gross modification of the rotational speeds of gears 30, 31 and of flexible rotor 76, which in turn modifies the proportional flow rates between the fluid motor assembly 12 and the gear pump assembly 15.

Alternately, or in addition to the above, second gear 92 may likewise be removably attached to flexible rotor 76, such that second gear 92 may be replaced instead of or in addition to first gear 91 to enable gross modification of the proportional flows between fluid motor assembly 12 and gear pump assembly 15. Still further, first and second gears 91 and 92 may be maintained, and gear pump body 42 may be interchangeable with a second pump body 44 having fluid inlet 97 and fluid outlet 98 directing fluid through pump body 44 and the open chamber 99 thereon holding a different rotor 79 or other gear members of varying construction in different gear pump bodies. The single screw connection provided by pivot screw 90 enables quick interchange of such alternate pump body configurations.

Likewise, while not particularly shown in FIG. 5, gear pump assembly 15 may be provided with recirculation channel 58 and valve 60 as discussed above to also enable fine adjustment of the proportional flows between fluid motor assembly 12 and gear pump assembly 15.

Figure 6:
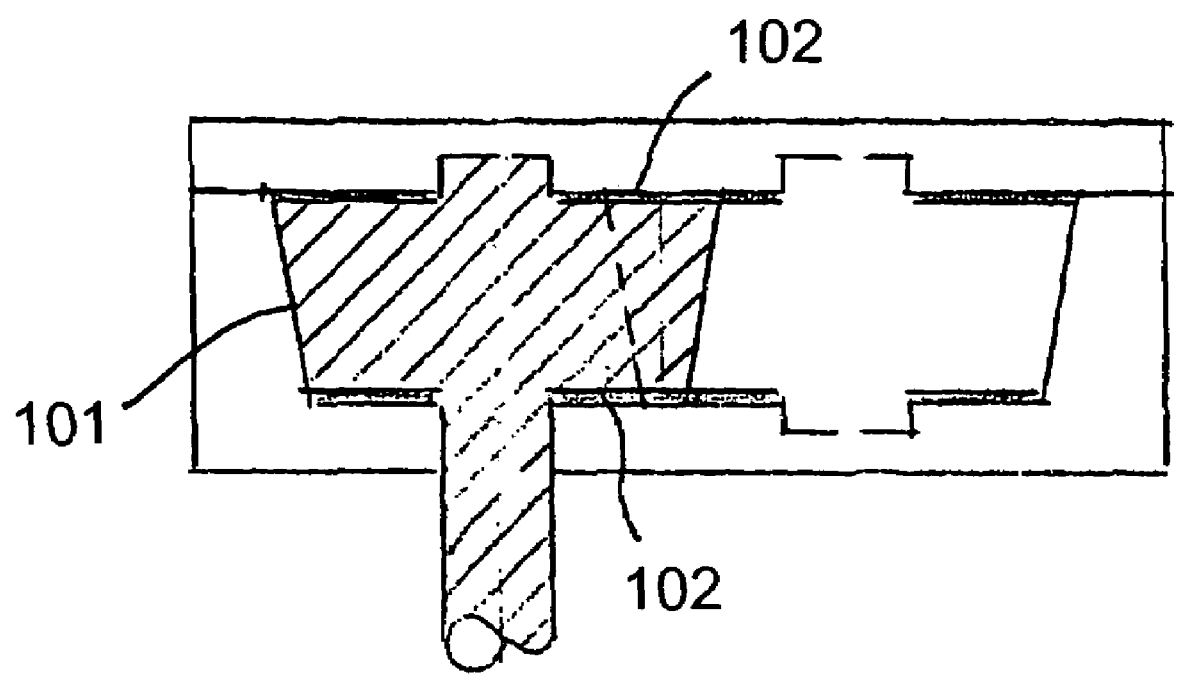
FIG. 6 is a sectional view of an alternate embodiment of the fluid motor assembly.

In yet another aspect of the invention, and as particularly shown in FIG. 6, instead of providing the fluid motor with cylindrical gears, in order to account for variable clearances that may result from tolerances in the manufacturing process without exorbitantly increasing manufacturing costs, the gear members 30 and 31 may be provided as round, parallel tooth gears having a tapered perimeter 101. In this case, the benefits of using a positive displacement pump as the fluid motor may be maintained without the associated disadvantages of leakage past the motor gears. More particularly, the positive displacement pump, and more particularly a gear pump, allows the fluid that drives the motor to likewise provide the lubrication for the gears and rotating shafts. Gears are quite common and easily manufactured whether by machining or, for low cost, molding from plastics or sintered from metal powders. However, for mixing or metering applications, it is desirable that there be little or no leakage past the gears by the driving fluid in order to obtain maximum output torque of the motor, and in mixing applications, that a repeatable and constant amount of driving fluid passes through the pump for each revolution of the gear set. To minimize leakage past the motor gears, it is advisable to have very close clearance fits between the perimeter of the gear teeth and the circular gear housing, and to have very little side clearance between the sides of the gears and the housing. In order to provide minimal clearance without exorbitantly increasing the manufacturing costs and risking high friction conditions (which in turn could render it difficult to start the fluid motor at low fluid pressure), the gear members in fluid motor assembly 12 are formed as parallel tooth gears having a tapered or cone-shaped perimeter 101. The chambers in which tapered gears 30 and 31 sit is likewise preferably tapered to that the gears 30 and 31 can be individually placed in the tapered housing to a depth that would ensure a close fit regardless of manufacturing tolerances. Notably, such manufacturing tolerances may cause a clearance to be produced between the top and bottom walls of the gears and the top and bottom walls of the chamber, respectively. Such clearances are preferably filled with upper and lower flat shims 102 to the required thickness, thus resulting in close clearances between both the outside diameters of the gears as well as between the gear faces and the motor housing.

Operation of the blending pump assembly of the present invention will now be described with reference, for exemplary purposes, to the particular embodiment shown in FIG. 1 and the schematic drawings in FIG. 7. The fluid motor assembly 12 is driven by fluid pressure from a first fluid 105 directed through inlet fluid channel 21. Thus, in the particular embodiment depicted in FIG. 1, it is the flow of fluid that drives the first pair of gears 30, 31 in gear motor assembly 12, as opposed to driving the gears to cause fluid to flow. Gears 30, 31 are meshed together and counter-rotate relative to each other when the first fluid 105 is directed through the inlet fluid channel to the outlet fluid channel 24. Shaft 34 from one of the fluid pressure driven gears, gear 30, extends upward through the housing to drive one of the gears, gear 46 of the gear pump assembly 15, which in turn will cause the gears 46, 47 in gear pump assembly 15 to counter rotate relative to each other in order to draw a second fluid 107 through inlet port 51 and pump such second fluid 107 out through outlet port 52.

It can be seen, therefore, that flow of such first fluid 105 enables the pumping of such second fluid 107 since one gear of each pair is secured to a common rotating shaft. The first pair of gears and second pair of gears are sized to provide a predetermined proportion of such second fluid 107 based on the flow of such first fluid 105. The proportional flow of the second fluid in relation to the first fluid may be finely adjusted by adjusting the amount of flow through recirculation channel 58 by use of valve 60. Since pump assembly 15 provides a positive displacement gear pump, increased flow through recirculation channel 58 results in decreased flow through outlet port 52. Additionally, the proportional flow may be grossly adjusted by changing the gears in the gear train between fluid motor drive axel 39 and fluid pump drive axel 93 (or by replacing gear pump body 42 with an alternate gear pump body having a distinct gear or rotor configuration) to enable a single pump assembly to be used in a wide variety of mixing applications.

As shown in the schematic view of FIG. 7, the combined fluid motor/pump apparatus 10 thus enables the proportional mixing of two distinct fluids, wherein the fluid pressure from the first fluid 105 serves as a driving force for a pump to pump a second fluid 107. Blending pump assemblies may be combined in series, such that the mixture from a first assembly 111 may be continuously diluted by directing the mixture through a second assembly 114, while directing the driving fluid through a second non-driven (or fluid pressure driven) motor with a common rotating shaft.

Notably, while not particularly shown in the Figures, a low power electric motor, and more preferably a battery-powered low power electric motor, may also be provided with a rotary drive shaft of such motor engaging the driving gear 30 in the fluid motor assembly to further assist motor start-up when the driving fluid is under low pressure. Utilizing a gear motor with very close clearances between the moving parts, there may be locations at which contact between the moving parts occurs, causing friction and hesitancy in initiating motor operation (particularly in those cases when low fluid pressures are used to drive the fluid motor). The battery-powered low power electric motor (or optionally line voltage powered electric motor) may thus assist the low-pressure fluid in overcoming such friction, providing an inexpensive remedy. While such assembly may assist in start-up of the blending pump assembly, it is intended that once operation has begun, continuous operation can be maintained without requiring continuous operation of the electric motor. Thus, after the fluid motor has started running, continuous operation may be maintained by the pressurized fluid source with little or no continuous power supply to the electric motor, and the electric motor speed is controlled primarily by the fluid pressure applied by the driving fluid and any flow restrictions in the fluid circuit.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art could modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

I claim:

1. A system for blending fluids, comprising:
   a fluid motor housing having a fluid motor rotatable element positioned within a fluid motor open chamber on an interior of the fluid motor housing, a fluid motor inlet channel and a fluid motor outlet channel in fluid communication with the fluid motor open chamber, and a drive axle connected to the fluid motor rotatable element and extending through the fluid motor housing;
   a first fluid pump housing having a first fluid pump rotatable element positioned within a first fluid pump open chamber on an interior of the first fluid pump housing and isolated from fluid flow with the fluid motor open chamber, and a first fluid pump inlet channel and a first fluid pump outlet channel in fluid communication with the first fluid pump open chamber; and
   an intermediate drive assembly between and engaging said drive axle and said first fluid pump rotatable element such that torque generated by the fluid motor rotatable element is transferred to the first fluid pump rotatable element through said drive axle and said intermediate drive assembly.

2. The system of claim 1, wherein said first fluid pump housing is pivotally attached to said fluid motor housing.

3. The system of claim 2, wherein said first fluid pump housing is removable from said fluid motor housing.

4. The system of claim 2, further comprising a pivot screw extending through said first fluid pump housing and into said fluid motor housing, said pivot screw maintaining a pivoting connection between said fluid motor housing and said first fluid pump housing when loosened, and said pivot screw further maintaining a fixed connection between said fluid motor housing and said first fluid pump housing when tightened.

5. The system of claim 1, said intermediate drive assembly further comprising a drive train having a first gear fixed to said drive axle and a second gear fixed to said first fluid pump rotatable element, wherein said first gear and said second gear drivingly engage one another.

6. The system of claim 1, further comprising a second fluid pump housing having a second fluid pump rotatable element positioned within a second fluid pump open chamber on an interior of the second fluid pump housing, and a second fluid pump inlet channel and a second fluid pump outlet channel in fluid communication with the second fluid pump open chamber, said second fluid pump housing being configured for removable and pivoting attachment to said fluid motor body to replace said first fluid pump housing, wherein replacing said first fluid pump housing with said second fluid pump housing results in change in proportional flow of fluids through said system.

7. The system of claim 6, wherein said second fluid pump rotatable element is configured to provide a different volumetric flow through said second fluid pump housing for a single revolution of said second fluid pump rotatable element from a volumetric flow through said first fluid pump housing for a single revolution of said first fluid pump rotatable element.

8. A blending pump comprising:
   a fluid motor housing having a plurality of fluid motor gears positioned within a fluid motor open chamber on an interior of the fluid motor housing, a fluid motor inlet channel and a fluid motor outlet channel in fluid communication with the fluid motor open chamber, and a drive axle connected to one of said fluid motor gears and extending through the fluid motor housing;
   a first fluid pump housing having a first plurality of fluid pump gears positioned within a first fluid pump open chamber on an interior of the first fluid pump housing and isolated from fluid flow with the fluid motor open chamber and a first fluid pump inlet channel and a first fluid pump outlet channel in fluid communication with the first fluid pump open chamber; and
   an intermediate drive assembly between and engaging said drive axle and one of said first fluid pump gears such that torque generated by the fluid motor gears is transferred to the fluid pump gears through said drive axle and said intermediate drive assembly.

9. The system of claim 8, wherein said first fluid pump housing is pivotally attached to said fluid motor housing.

10. The system of claim 9, wherein said first fluid pump housing is removable from said fluid motor housing.

11. The system of claim 9, further comprising a pivot screw extending through said first fluid pump housing and into said fluid motor housing, said pivot screw maintaining a pivoting connection between said fluid motor housing and said first fluid pump housing when loosened, and said pivot screw further maintaining a fixed connection between said fluid motor housing and said first fluid pump housing when tightened.

12. The system of claim 8, said intermediate drive assembly further comprising a drive train having a first gear fixed to said drive axle and a second gear fixed to one of said first fluid pump gears, wherein said first gear and said second gear of said drive train drivingly engage one another.

13. The system of claim 8, further comprising a second fluid pump housing having a second plurality of fluid pump gears positioned within a second fluid pump open chamber on an interior of the second fluid pump housing, and a second fluid pump inlet channel and a second fluid pump outlet channel in fluid communication with the second fluid pump open chamber, said second fluid pump housing being configured for removable and pivoting attachment to said fluid motor body to replace said first fluid pump housing, wherein replacing said first fluid pump housing with said second fluid pump housing results in change in proportional flow of fluids through said system.

14. The system of claim 13, wherein said second plurality of fluid pump gears is configured to provide a different volumetric flow through said second fluid pump housing for a single revolution of said second pair of fluid pump gears from a volumetric flow through said first fluid pump housing for a single revolution of said first plurality of fluid pump gears.

* * * * *